Jan. 30, 1951 A. J. ACKERMAN 2,540,023
AUTOMOBILE CARRIED RACK FOR
THE SUPPORT OF GARMENT HANGERS
Filed Oct. 19, 1949
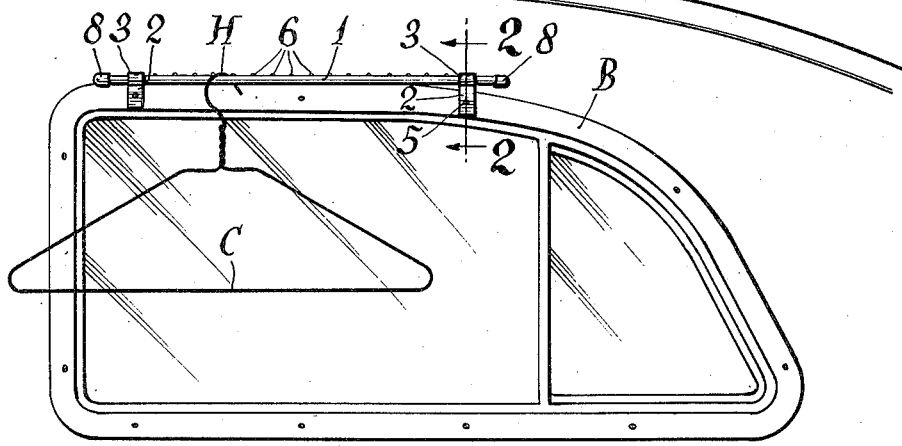
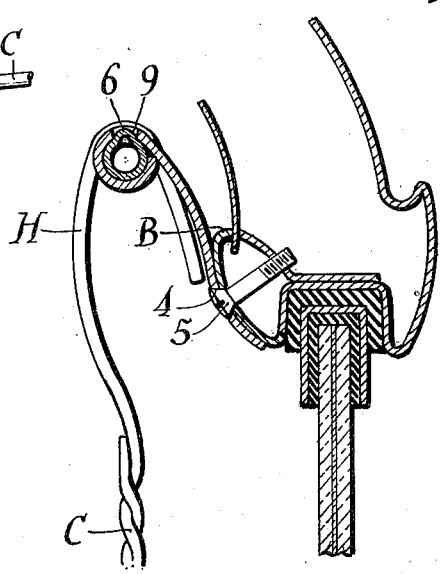
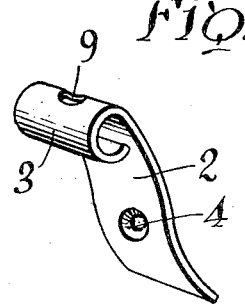
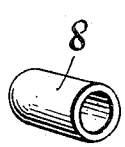
Inventor
Arthur J. Ackerman,
By
Attorney Patented Jan. 30, 1951

2,540,023

UNITED STATES PATENT OFFICE 2,540,023

AUTOMOBILE CARRIED RACK FOR THE SUPPORT OF GARMENT HANGERS

Arthur J. Ackerman, Buffalo, N. Y.

Application October 19, 1949, Serial No. 122,246

1 Claim. (Cl. 224—42.45)

This invention relates to improvement in automobile carried racks for the support of garment hangers.

In touring by automobile, with the limited space provided for baggage and with the necessity of carrying relatively small suit cases or travelling bags in which suits of clothes will not maintain proper appearance, and with the desirability of carrying and maintaining suits properly pressed, it has long been proposed to support the suits on a garment hanger suspended from a rack attached to some part of the automobile. Sundry devices have been proposed for this purpose, all of which, as far as I am aware, have had practical objections which have made their use undesirable. These objections are the tendency of the garment hangers to slide upon their supporting bars and the lack of adaptability of the devices for suitable support by automobile parts of varying design and dimensions.

The object of the invention is to provide a rack for use in the interiors of automobiles wherein effective provision is made for its support from the bezel of the rear side window of an automobile, for its convenient mounting and removal as occasion may require, for the prevention of the sliding of the garment hanger on the rack bar and for the prevention of the displacement of the rack bar relatively to its supporting brackets, these purposes being accomplished by novel features which are utilized in the assembly of the rack bar and its supporting brackets and in the mounting of the rack in the automobile.

In the accompanying drawings:

Figure 1 is an elevation of the rack as secured to the upper bezel of a rear-most side window of an automobile.

Figure 2 is a section on the line 2—2 of Figure 1 looking in the direction of the arrows.

Figure 3 is a fragmentary plan view of the rack bar, this figure also showing a coat hanger suspended from the rack bar.

Figure 4 is a perspective view of one of the supporting brackets for the rack bar, this view showing the bracket as it is formed prior to its connection to the rack bar.

Figure 5 is a perspective view of one of the finials which are provided at each end of the rack bar.

The structural elements of a rack in accordance with the invention are a straight horizontal rack bar 1 and a pair of supporting brackets 2. The brackets 2 are attached to a suitable part of the automobile and each bracket at its free end terminates in an integral sleeve 3 adjacent its under face and in which the bar 1 is fitted.

The rack is constructed for support from the upper portion of the bezel of a rear-most side window of an automobile. For this purpose the brackets 2 are of ogee outline in suitable degree with their lower portions curved in conformity to the curvature of the wall of the bezel B to which they are attached and formed with openings 4 for the accommodation of fastening screws 5 by which they are connected to the bezel, the sleeves 3 being provided at the upper ends of the brackets 2 and adjacent the outer sides of the bodies of the brackets. The brackets 2 may be located at any suitable points along the length of the bar 1.

The rack bar 1 is preferably of tubular construction and is formed with a lineally extending row of rather shallow projections or "buttons" 6, these being preferably of hemispherical outline and being suitably mutually spaced equidistantly. In the operative position of the bar 1 the row of projections 6 extends along its upper side and clearances 7 are provided between the adjacent projections, the degree of mutual spacing of the projections being dictated by their function of holding the hook H of the coat hanger C against angular and lineal displacement. This is apparent from Figure 3 which shows a hook H extending through a clearance 7 in diagonal relation to the bar with its opposite sides engaging adjacent projections 6.

The bar 1 may be provided at its ends with finials 8 of any desired form, these being shown as caps which may have a friction (or threaded) fit upon the ends of the bar and may be readily removed and replaced as occasion may require. The sleeevs 3 are originally partly open as shown in Figure 4 whereby their internal diameter will be greater than the maximum outside diametrical dimension of the bar, in order that they may be readily slipped over the ends of the bar and moved to any appropriate positions along its length. Each sleeve is formed in its upper side with an opening 9 of an extent conforming to the width of a projection 6. Any suitably located projection 6 may be used to hold a bracket 2 and the bar 1 against relative sliding displacement. Each sleeve is moved to a suitable position along the bar 1 with its opening 9 in alinement with a projection 6. Thereupon by means of a pair of pliers or other suitable tool the sleeve is closed upon the bar with the projection 6 located in the opening 9, relative sliding displacement of the sleeve and the bar thereby being positively prevented.

The ogee form of the bracket suitably spaces the bar 1 from the bezel, thereby providing a clearance for the terminal portion of the hook of the coat hanger. The bezel will confine the hook of the coat hanger substantially in the diagonal position in which it is shown in Figure 3 in which position adjacent buttons 6, between which the hook passes, will prevent the coat hanger from sliding along the bar.

The trapezoidal body of the coat hanger will preferably extend diagonally under the bar at an angle less than the angle at which the hook extends. Ample clearance will be provided between the body of the coat hanger and the rear window for the accommodation of a suit upon the hanger. Two or three or more hangers may be hung from the bar with their trapezoidal portions in overlapping relation. Thus several suits may be supported from the bar 1. The desirable angles of the hook of the hanger and its trapezoidal portion relatively to one another in order that the hanger may be suspended from the bar in the relation described may be conveniently provided for, if necessary, by the use of any suitable implement for twisting the hook of the hanger to the proper degree relatively to the trapezoidal portion.

The hanger is applicable to automobiles wherein the windows will vary in design and dimensions, such variations being compensated by the proper location of the brackets 2 along the bar 1. In some cases where the rear portion of the window frame may be curved and it is desirable to use a bar 1 of maximum length the ogee bodies of the brackets 2 may be made longer and shorter, as shown in Figure 1, wherein the foremost bracket is shorter and the rearmost bracket, which is attached to a lineally curved rear portion of the bezel, is longer.

I claim:

An automobile carried rack for the support of garment hangers from the upper portion of the bezel of a rear side window of an automobile comprising a straight horizontal rack bar having a lineal row of projections along its upper face mutually spaced to provide clearances of such extent that the hook of a coat hanger extending through a clearance will engage adjacent projections at its opposite sides and a pair of supporting brackets, each of ogee outline, having openings in their lower portions to accommodate screws by which the brackets are secured to the upper portion of the bezel of a rear side window of an automobile, each bracket projecting upwardly from the bezel and being formed with an integral terminal sleeve adjacent its underface, each sleeve being originally open to an extent to permit it to be slipped over the rack bar and moved to any suitable position along its length and being provided at its upper side with an opening of a diameter conforming to the width of each projection, each sleeve being positioned upon the rack bar with its opening in alinement with a projection and, when closed, snugly encircling the rack bar with the projection located in said opening, thereby to prevent relative lineal displacement of the bracket and the rack bar.

ARTHUR J. ACKERMAN.

REFERENCES CITED

The following references are of record in the file of this patent:

UNITED STATES PATENTS

| Number | Name | Date |
|---|---|---|
| 220,675 | Smith et al. | Oct. 14, 1879 |
| 550,791 | Huebel | Dec. 3, 1895 |
| 1,073,231 | Harrison | Sept. 16, 1913 |
| 1,376,330 | Gibson | Apr. 26, 1921 |
| 1,799,319 | Reynolds | Apr. 7, 1931 |
| 2,454,368 | Auskelis et al. | Nov. 23, 1948 |